Aug. 5, 1924.
A. LATHAM
1,503,539
METHOD OF MAKING BUTTONS
Filed Jan. 9, 1919
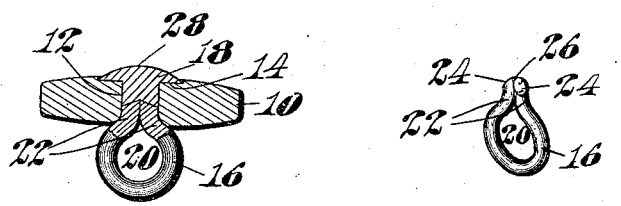
Fig.1.    Fig.2.
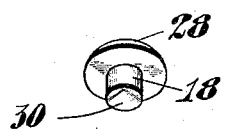
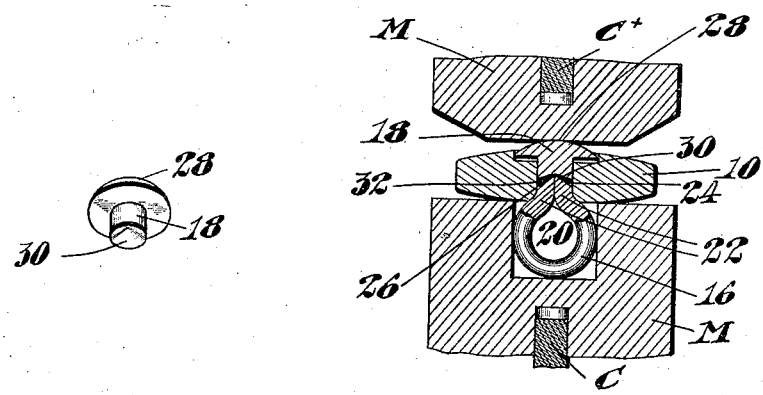
Fig.3.    Fig.4.
INVENTOR
Albert Latham
By his Attorney Patented Aug. 5, 1924.

1,503,539

UNITED STATES PATENT OFFICE.

ALBERT LATHAM, OF BEVERLY, MASSACHUSETTS, ASSIGNOR TO AMERICAN BUTTON & FASTENER CO., OF AUGUSTA, MAINE, A CORPORATION OF MAINE.

METHOD OF MAKING BUTTONS.

Application filed January 9, 1919. Serial No. 270,304.

*To all whom it may concern:*

Be it known that I, ALBERT LATHAM, a citizen of the United States, residing at Beverly, in the county of Essex and State of Massachusetts, have invented certain Improvements in Methods of Making Buttons, of which the following description, in connection with the accompanying drawings, is a specification, like reference characters on the drawings indicating like parts in the several figures.

My invention relates to a method of making buttons. It is of especial utility in connection with such articles having a frangible portion. In the manufacture of buttons from mother-of-pearl and like material, in which the pearl body has securing means including cooperating members, usually of metal, one of which members may be the eye and the other the oppositely placed retaining stud joined to the shank of the eye, it has been found difficult to assemble the elements properly without breaking the body. With the contacting ends of the shank and stud flat, as illustrated in Reissue Patent No. 14,459, Elliott, April 23, 1918, or irregularly formed, the application of pressure in effecting their union is liable to deflect them laterally, throwing a strain upon the body and frequently breaking it. When the union of the securing members is brought about under the influence of heat, as by electric welding, closed spaces may be formed between the ends of the members, in which contained gases are expanded by the heat until they blow through the sides of the members and burst the body of the button.

To remove the objections outlined above, an object of this invention is to provide a method of making a button in which such destructive stresses are not produced. In the attainment of this object, I form the ends of the securing members for the button body to contact only over an inner area or one removed from their edges, as at a point near the centers of the end surfaces, and then force them together within the body to join them to one another. The engagement at the central point prevents lateral movement, and the union takes place from this point of contact outwardly toward the periphery, and avoids the formation of pockets. I prefer to form upon the end of the member opposite the projection a depression to receive and center the members relatively to one another. When the members are welded together, the absence of enclosed spaces between them prevents gas-expansion from injuring the button. In uniting the members, heat may be applied, as by the passage of an electric current while they are pressed together, to weld them.

One form of the button resulting from my improved method is illustrated and the steps of production are indicated by the accompanying drawing, in which—

Fig. 1 is a central vertical section through the completed button;

Fig. 2 is a perspective view of the eye formed preparatory to assembling it with the body;

Fig. 3 is a similar view of the stud; and

Fig. 4 is a central vertical section through the button elements assembled for the final step of welding.

The button is shown as having a body portion 10, which may be cut in any convenient manner from mother-of-pearl or the like or may be molded from suitable material, it being of any desired shape, as a disk. Extending axially of the body is an opening 12, with a cylindrical recess 14 surrounding it at one face of the disk. For the attachment of the button, two securing members are provided, which here appear as an eye 16 and a stud 18. The eye is preferably of wire bent to surround the attaching opening 20 and give a double shank portion 22, the ends of the wire lying side by side and adapted to enter the opening 12. The extremity of the shank is formed in a reduced projection near the center or at the axis of the shank. This projection may be produced in severing the length of wire for the eye by cutting it at angles to give opposite surfaces 24, 24 converging to the point 26. The stud may be struck by dies out of a section of wire, it having a main portion to enter the body opening, and a convex head 28 of such diameter that it may be seated in the recess 14. At the end of the main portion of the stud is a depression 30, which I have illustrated as conical, the apex of the cone lying at or near the axis.

When the elements of the button are assembled for uniting them, the projection 26 is substantially alined in the body opening with the bottom of the depression 30, so that they contact near the common axis of the securing members at a point removed from their edges. From this point of contact the adjacent surfaces diverge, leaving a space 32. The securing members are then forced toward one another, as by pressure applied through members M, M, which also furnish the terminals of an electric circuit indicated at C, this carrying such a volume of current as to give a heating effect through the resistance of the contacting surfaces of the securing members sufficient to accomplish their welding. In the formation of the weld, the two members are held correctly alined with regard to the opening in the body without the exertion of undue lateral pressure thereon, and the union between the surfaces occurs along areas gradually increasing outwardly from the contracted initial point of contact until the outer edges are reached, as appears in Fig. 1. By this procedure, no spaces can be left tending to enclose gases, the expansion of which by the heat of the operation might cause injury to the body.

Having described my invention, what I claim as new and desire to secure by Letters Patent of the United States is:

1. The method of making buttons having a body and co-operating securing members extending into the body, which consists in forming the adjacent ends of said members to contact only over an area removed from their edges, and forcing the ends of the members together within the body to join them to one another.

2. The method of making buttons having a body and co-operating securing members extending into the body, which consists in forming the end of one of said members in a point, forming another member with a depression, placing such member in contact with the associated member near its center only, and forcing the members together to bring the remainder of the ends into contact to join them to one another.

3. The method of making buttons having a body and co-operating securing members extending into the body, which consists in forming the end of one of said members in a point and the associated member with a depression, and forcing the point and depression together to join the members to one another within the body.

4. The method of making buttons having a body, an eye provided with a double shank extending into the body and a stud co-operating with the shank within the body, which consists in forming the portions of the shank with converging surfaces and the stud with a depression to receive said surfaces, and joining the shank portions and stud under pressure.

5. The method of making buttons having a body and co-operating securing members extending into the body, which consists in forming the adjacent ends of said members to contact only over an area removed from their edges, and applying heat and pressure to the members to join the ends within the body.

6. The method of making buttons having a body and co-operating securing members extending into the body, which consists in forming the adjacent ends of said members to contact only over an area removed from their edges, and electrically welding the ends within the body.

7. The method of making buttons having a body, an eye provided with a double shank extending into the body and a stud co-operating with the shank within the body, which consists in forming the portions of the shank with converging surfaces and the stud with a depression to receive said surfaces, and subjecting the shank portions and stud to pressure and the heating effect of an electric current to join them within the body.

In testimony whereof I have signed my name to this specification.

ALBERT LATHAM.